(12) United States Patent
Nakamura et al.

(10) Patent No.: US 8,098,564 B2
(45) Date of Patent: Jan. 17, 2012

(54) OBJECTIVE LENS FOR OPTICAL PICKUP APPARATUS, OBJECTIVE LENS UNIT FOR OPTICAL PICKUP APPARATUS AND OPTICAL PICKUP APPARATUS USING THE SAME

(75) Inventors: Kentarou Nakamura, Tokyo (JP); Eiji Nomura, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/973,456

(22) Filed: Dec. 20, 2010

(65) Prior Publication Data

US 2011/0090781 A1 Apr. 21, 2011

Related U.S. Application Data

(63) Continuation of application No. 11/600,444, filed on Nov. 16, 2006, now Pat. No. 7,885,167.

(30) Foreign Application Priority Data

Nov. 29, 2005 (JP) ................ 2005-343651

(51) Int. Cl.
*G11B 7/135* (2006.01)
(52) U.S. Cl. ................................. 369/112.23
(58) Field of Classification Search ........................ None
See application file for complete search history.

(56) References Cited

U.S. PATENT DOCUMENTS 6,829,105 B2 12/2004 Kubo
7,054,254 B2 5/2006 Maruyama
7,110,344 B2 9/2006 Kimura
2001/0028514 A1 10/2001 Asoma
2003/0184881 A1 10/2003 Itonaga
2004/0213132 A1 10/2004 Yamanaka et al.
2005/0018585 A1 1/2005 Itonaga
2005/0041560 A1 2/2005 Katsuma et al.
2005/0259554 A1 11/2005 Katsuma et al.
2007/0171803 A1* 7/2007 Kim et al. ................ 369/112.23
2010/0054108 A1* 3/2010 Kimura ..................... 369/112.25

FOREIGN PATENT DOCUMENTS

| JP | 2003005032 | 1/2003 |
| JP | 2003091854 | 3/2003 |
| JP | 2003107341 | 4/2003 |
| JP | 2003114380 | 4/2003 |

\* cited by examiner

*Primary Examiner* — Will J Klimowicz
*Assistant Examiner* — Emily Frank
(74) *Attorney, Agent, or Firm* — Cozen O'Connor

(57) ABSTRACT

The present invention relates to an objective lens, an objective lens unit and an optical pickup apparatus. The objective lens is provided for an optical pickup apparatus recording or reproducing information by converging a light flux with a wavelength $\lambda 1$ emitted from a light source onto an information recording surface of an optical information recording medium. The objective lens is formed of: a single lens having at least one aspheric surface. In the objective lens, an effective aperture, a thickness on an optical axis, a focal length, a numerical aperture, and a refractive index satisfy the predetermined conditional expressions. The objective lens unit is provided for an optical pickup apparatus and includes an aberration correcting element and the objective lens.

5 Claims, 3 Drawing Sheets

OBJECTIVE LENS FOR OPTICAL PICKUP APPARATUS, OBJECTIVE LENS UNIT FOR OPTICAL PICKUP APPARATUS AND OPTICAL PICKUP APPARATUS USING THE SAME

CROSS REFERENCE TO RELATED APPLICATIONS

This application is a continuation of U.S. patent application Ser. No. 11/600,444 which was filed with the U.S. Patent and Trademark Office on Nov. 16, 2006. Priority is claimed for this invention and application, corresponding application (s) having been filed in Japan on Nov. 29, 2005, No. 2005-343651. The entire contents of both above-mentioned applications are incorporated herein by reference.

TECHNICAL FIELD

The present invention relates to an objective lens formed by a single lens for an optical pickup apparatus, an objective unit for an optical pickup apparatus and an optical pickup apparatus using the same, more particularly, to an objective lens having a long working distance for an optical pickup apparatus, an objective lens unit for the optical pickup apparatus and an optical pickup apparatus using the same.

BACKGROUND

In recent years, shorter wavelength laser sources used as light sources for reproducing or recording information for an optical disc which is an optical information recording medium have been developed. For example, laser sources having wavelengths of from 380 nm to 420 nm including blue violet semiconductor laser diodes and SHG lasers which convert the wavelength of infrared semiconductor laser by utilizing second harmonic generation, have been developed.

By using these blue violet laser sources, it becomes possible to record information of 15 GB-20 GB onto an optical disc having diameter of 12 cm, when employing an objective lens having the same numerical aperture (NA) used for DVD (Digital Versatile Disc). It becomes possible to record 23 GB-25 GB information onto an optical disc having diameter of 12 cm, when raising NA of an objective lens to 0.85. An optical disc and an optical magnetic disc both employing a blue violet laser source will be generically named "a high density optical disc" in this specification.

As the high density optical disc, so far, two types of optical disc formats have been proposed. One is an optical disc format using an objective lens having NA 0.85, the thickness of a protective layer is 0.1 mm, which is called Blu-ray disc, (hereinafter, which will be called BD). The other is an optical disc format using an objective lens having NA 0.65-0.67, the thickness of a protective layer is 0.6 mm, which is called HD DVD, (hereinafter, which will be called HD). Currently, DVDs and CDs (Compact Discs), onto which various kinds of information are recorded, are sold in the market place.

When, for example, assuming that an optical pickup apparatus is configured into a note type personal computer, the optical pickup apparatus needs to be a compact size. When trying to minimize the size of the optical pickup apparatus, making the effective diameter of an objective lens small is effective. However, in general, when suppressing the effective diameter of the objective lens, the focal length of the objective lens becomes short. As a result, there exists a problem that a working distance of the objective lens, which is necessary to avoid contacts of an optical disc with the objective lens, becomes short. Particularly when trying to establish compatibility of the objective lens between BD and CD or between BD and DVD, it is necessary to secure an enough working distance of the objective lens when using CD or DVD. Accordingly, when using BD, a further longer working distance becomes necessary. Further, in order to decrease the load of an actuator for driving an objective lens, a lightweight objective lens is required.

In order to solve the problem described above, Japanese Patent Applications Open to Public Inspection (JP-A) Nos. 2003-5032, 2003-114380, 2003-107341 and 2003-91854 disclose several kinds of objective lenses.

Since the objective lens disclosed in Example 9 in JP-A No. 2003-5032 has a small diameter, it helps optical pickup apparatus to be made small. However, there is a problem that due to the high refractive index, the weight of the lens becomes heavy and the material cost of the lens goes up. Each of the objective lenses disclosed in Example 1 in JP-A No. 2003-107341 and Examples 1, 2, and 3 in JP-A No. 2003-91854 has a small diameter and a low refractive index. However, since these examples have an excessively smaller diameter, these have problems that their working distances become too short. Especially, they have large difficulty about obtaining working distance required as a compatible objective lens commonly used for information recording or reproducing on optical discs in a plurality of kinds having different formats. Further, each of objective lenses disclosed in Example 9 in JP-A No. 2003-5032, Example 2 in JP-A No. 2003-114380, Example 1 in JP-A No. 2003-107341, and Examples 3, 4, 5, and 6 in JP-A No. 2003-91854 has a problem that a suitable working distance on actual use is hard to be secured with an optical property required on actual use being kept since a thickness on the optical axis and focal length for a refractive index of the each objective lens is not optimized with good balance.

SUMMARY

An object of the present invention is to provide an objective lens and an objective unit both used for an optical pickup apparatus being capable of recording or reproducing information at least for a high density optical disc, and to provide an optical pickup apparatus using the same. The objective lens and the objective unit both used for the optical pickup apparatus enable to miniaturize the optical pickup apparatus, have a relatively long working distance with keeping an optical property required for actual use, and secure a suitable working distance for actual use.

An objective lens according to the present invention is provided for an optical pickup apparatus for recording or reproducing information by converging a light flux from a light source on an information recording surface of an optical information recording medium. The objective lens is a single lens having at least an aspherical surface. In the objective lens, an effective diameter, a thickness of the objective lens on the optical axis, a focal length and a refractive index for the wavelength of the light source of the objective lens satisfy predetermined conditional expressions.

In this specification, an optical disc includes an optical disc having a protective layer having a thickness of from several to several tenth nm, an optical disc having a protective substrate or a protective layer having a thickness of zero (0), and an optical disc in which plural information recording surfaces are structured. Further, the high density optical disc in this specification includes a magneto-optic disc, which uses blue violet semiconductor laser diodes and SHG lasers as a light source for recording/reproducing information.

In this specification, DVD is a general term for DVD series discs such as DVD-ROM, DVD-Video, DVD-Audio, DVD-RAM, DVD-R, DVD-RW, DVD+R, DVD+RW. CD is a general term for CD series discs such as CD-ROM, CD-Audio, CD-Video, CD-R and CD-RW. DVD and CD include an optical disc in which plural layers of information recording surfaces are structured.

These and other objects, features and advantages according to the present invention will become more apparent upon reading of the following detailed description along with the accompanied drawings.

BRIEF DESCRIPTION OF THE DRAWING

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
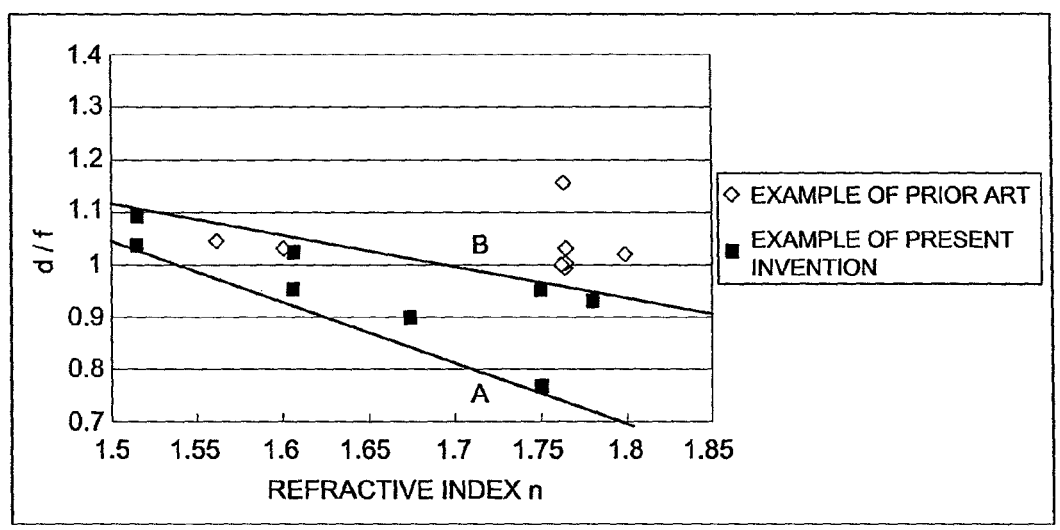
FIG. 1 illustrates a graph comparing examples according the present invention and examples according to a prior art from the view points of a refractive index n and d/f.

Preferred embodiments according to the present invention will be described below.

A preferred embodiment according to the present invention is an objective lens for an optical pickup apparatus recording or reproducing information by converging a light flux with a wavelength $\lambda 1$ (380 nm $<\lambda 1<$ 420 nm) emitted from a light source onto an information recording surface of an optical information recording medium. The objective lens is formed of a single lens including at least one aspheric surface. The objective lens satisfies the following expressions, where $\phi$ (mm) is an effective aperture at a light source side of the objective lens, d (mm) is a thickness on an optical axis of the objective lens, if (mm) is a focal length of the objective lens, NA is a numerical aperture at an image side of the objective lens, and n is a refractive index of the objective lens for the wavelength $\lambda 1$.

$$2.0 \leq \phi \leq 4.0 \quad (1)$$

$$1.5 < n < 1.8 \quad (2)$$

$$0.7 < d/f < 1.2 \quad (3)$$

$$0.8 < NA < 0.9 \quad (4)$$

$$-1.17n + 2.8 < d/f < -0.59n + 2.0 \quad (5)$$

By using the objective lens being a single lens, the optical pickup apparatus can be miniaturized. Further, since the objective lens satisfies the conditional expressions (1)-(5), it provides an objective lens being a single lens for use in an optical pickup apparatus being capable of recording or reproducing information at least for the high density optical disc. The above objective lens enables to miniaturize the optical pickup apparatus, and is designed to be optimized for a thickness on the optical axis and a focal length of the objective lens. The objective lens is easily produced without having an excessively thin minimum thickness section (which means generally a flange section positioned around an optical surface of the lens) with securing enough thickness, further has a relatively long working distance comparing to the focal length, and secures a suitable working distance for actual use. Accordingly, two conflict requirements, which are to prolong the working distance of the objective lens and to minimize the size of the optical pickup including the objective lens, can be realized while keeping mass-productivity of the objective lens.

Especially, the objective lens satisfying the conditional expression (1) prevents a working distance from being excessively short with enabling miniaturization of the optical pickup apparatus. The objective lens satisfying the conditional expression (2) enables a weight saving of the objective lens. The objective lens satisfying the conditional expression (3) easily enables an optical property with usable level and a relatively long working distance. The objective lens satisfying the conditional expression (4) secures, for example, a numerical aperture at an image side required for BD. Therefore, the objective lens designed so as to be optimized for actual use as described above as an objective lens for use in an optical pickup apparatus being capable of recording or reproducing information at least for BD. Further, the conditional expression (5) shows the relationship between an optimum refractive index n and d/f in order to obtain a lens having a longer working distance and providing a good balance of, for example, an optical property. In FIG. 1, the lower limit of the conditional expression (5) is illustrated in a line A, and the upper limit is illustrated in a line B. Design examples according to the present invention fall in an area between lines A and B. Each of conventional examples which fall in the area between lines A and B, has an excessively small diameter (diameter: 1.70 mm), which does not satisfy the conditional expression (1). Other conventional examples exist in an area upper than the line B. As described above, an objective lens enabling suitable length of a long working distance can be obtained while maintaining the performance of the objective lens in a practical level by satisfying the conditional expression (5).

The above embodiment preferably satisfies the following expression.

$$1.5 < n < 1.75 \quad (6)$$

The objective lens satisfying the conditional expression (6) further saves a weight thereof.

Further, the above embodiment preferably satisfies the following expression.

$$1.55 < n < 1.8 \quad (7)$$

The objective lens satisfying the conditional expression (7) provides an objective lens having thinner axial thickness, reduces the maximum face angle of an optical surface of the objective lens, and enables easy processing of a metal molding die for forming a lens and easy forming of the lens.

In the above embodiment, the objective lens is preferably formed of a glass. Since the refractive index of glass is higher than that of optical resin, processing of the metal molding die is precisely conducted by moderating the face angle of an aspherical surface of the objective lens facing to a light source side. Further, since environmental resistance of glass is higher than that of plastic, the degradation of the image formation performance of the objective lens is small when environmental changes, such as temperature and humidity changes occur.

The objective lens formed of the glass preferably satisfies the following expression.

$$1.55 < n < 1.75 \quad (8)$$

The objective lens satisfying the conditional expression (8) further provides an inexpensive objective lens formed of glass, having a relatively light weight and a reduced maximum face angle of an optical surface, and enabling easy processing of a metal molding die for forming a lens and easy forming of the lens. It is further preferably that the objective lens formed of glass satisfies $1.60 < n < 1.75$.

In the above embodiment, the objective lens is also preferably formed of a resin. Since the weight of the objective lens made of resin is light, the load to a focusing actuator can be reduced and precise position control of the objective lens by the actuator becomes possible. As a result, the reduction of focusing error, minimization of an actuator and power saving can be attained. Further, mass-production of the lens with low cost becomes possible by applying an injection molding method utilizing a metal molding die.

In the above embodiment, it is preferable that the objective lens is formed of a resin in which inorganic particles with average diameter of 30 nm or less are dispersed, and that a change of a refractive index |dn/dT| corresponding to a temperature change is preferably less than $8 \times 10^{-5}$. Hereinafter, particles with average diameter of 30 nm or less is called microparticles.

As the above described resin, inorganic microparticles to be dispersed in the thermoplastic resin are not limited in particular, and suitable microparticles can be selected from inorganic microparticles which can achieve an objectives that resin composition to be obtained reduces a change rate of refractive index corresponding to temperature change (hereinafter, |dn/dT|). To be concrete, oxide microparticles, metal salt microparticles and semiconductor microparticles are preferably used, and it is preferable to use by selecting properly those wherein absorption, light emission and fluorescence are not generated in the wavelength area used as a lens, among the aforesaid microparticles.

The following metal oxide is used for the oxide microparticles: a metal oxide constructed by one or more kinds of metal selected by a group including Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi and rare earth metal. More specifically, for example, oxide such as silicon oxide, titanium oxide, zinc oxide, aluminum oxide, zirconium oxide, hafnium oxide, niobium oxide, tantalum oxide, magnesium oxide, calcium oxide, strontium oxide, barium oxide, indium oxide, tin oxide, lead oxide; complex oxide compounds these oxides such as lithium niobate, potassium niobate and lithium tantalate, the aluminum magnesium oxide ($MgAl_2O_4$) are cited. Furthermore, rare earth oxides are also used for the oxide microparticles. More specifically, for example, scandium oxide, yttrium oxide, lanthanum trioxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide are cited. As the metal salt microparticles, the carbonate, phosphate, sulfate, etc. are cited. More specifically, for example, calcium carbonate, aluminum phosphate are cited.

Moreover, the above semiconductor microparticles mean microparticles constructed by a semiconducting crystal. The semiconducting crystal composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) ($SnO_2$), tin sulfide (II, IV) (Sn(II) Sn(IV) $S_3$), tin sulfide (IV) ($SnS_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminu antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide (InSe) and indium telluride ($In_2Te_3$); compounds of an element of the 13th group in the periodic table and an element of the 16th group in the periodic table such as thallium chloride (I) (TlCl), thallium bromide (I) (TlBr), thallium iodide (I) (TlI); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MoS_2$) and tungsten oxide (IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $Cu_{146}Se_{73}$(triethylphosphine)$_{22}$, described in Adv. Mater., vol. 4, p. 494 (1991) by G. Schmid, et al., are also listed as examples.

In general, dn/dT of thermoplastic resin has a negative value, namely, a refractive index becomes smaller as a temperature rises. Therefore, it is preferable to disperse microparticles having large dn/dT, for making |dn/dT| of thermoplastic resin composition to be small efficiently. It is preferable that the absolute value of dn/dT of microparticles is smaller than dn/dT of the thermoplastic resin used as a base material in case of using microparticles having dn/dT with same sign to the sign of dn/dT of the thermoplastic resin. Furthermore, microparticles having positive dn/dT, which is microparticles having different sign of dn/dT from dn/dT of the thermoplastic resin which is a base material, are preferably used. By dispersing these kinds of microparticles into the thermoplastic resin, |dn/dT| of thermoplastic resin composition can effectively become small with less amount of the microparticles. Though it is possible to select properly dn/dT of microparticles to be dispersed, by using a value of dn/dT of thermoplastic resin to become a base material, it is preferable that dn/dT of microparticles is greater than $-20\times10^{-6}$ and it is more preferable that dn/dT of microparticles is greater than $-10\times10^{-6}$. As microparticles having large dn/dT, gallium nitride, zinc sulfate, zinc oxide, lithium niobate and lithium tantalite, for example, are preferably used.

On the other hand, when dispersing microparticles in thermoplastic resin, it is preferable that a difference of refractive index between the thermoplastic resin to become a base material and the microparticles is small. Further, there is a phenomena that the thermoplastic resin in which microparticles are dispersed when a difference of refractive index between the thermoplastic resin and the microparticles to be dispersed is small, hardly causes scattering when it transmits a light flux. In the thermoplastic resin in which the microparticles are dispersed, larger particles make larger scattering when it transmits a light flux. However it is observed that when a difference of refractive index between the thermoplastic resin and the microparticles to be dispersed is small, a rate of occurrence of scattering of light is low even when relatively large microparticles are used. A difference of refractive index between the thermoplastic resin and the microparticles to be dispersed is preferably within a range of 0 to 0.3, and a range of 0 to 0.15 is more preferable.

Refractive indexes of thermoplastic resins used preferably as optical materials for such as a lens are about 1.4 through 1.6 in many cases, and as materials of the microparticles to be dispersed in these thermoplastic resins, silica (silicon oxide), calcium carbonate, aluminum phosphate, aluminum oxide, magnesium oxide and aluminum magnesium oxides, for example, are preferably used.

Further, dn/dT of thermoplastic resin composition can be made small effectively, by dispersing microparticles whose refractive index is relatively low. As a reason why |dn/dT| of thermoplastic resin composition in which microparticles having low refractive index are dispersed becomes small, it is considered that temperature changes of the volume fraction of inorganic microparticles in the resin composition may work to make the |dn/dT| of the resin composition to become smaller when the refractive index of the microparticles is lower, although the details are not clarified. As microparticles having a relatively low refractive index, silica (silicon oxide), calcium carbonate and aluminum phosphate, for example, are preferably used.

It is difficult to improve simultaneously all of an effect of lowering dn/dT of the thermoplastic resin composition, light permeability and of a desired refractive index, and microparticles to be dispersed in the thermoplastic resin can be selected properly by considering a size of dn/dT of a microparticle itself, a difference of dn/dT between microparticles and the thermoplastic resin to become a base material, and the refractive index of the microparticles, depending on the characteristics which are required for the thermoplastic resin composition. Further, it is preferable, for maintaining light permeability, to use microparticles by selecting properly the affinity with the thermoplastic resin to become a base material, namely, dispersibility for the thermoplastic resin and microparticles which hardly cause light scattering.

For example, when using cyclic olefin polymer used for a lens preferably as a base material, silica is preferably used as microparticles which make |dn/dT| small while keeping light transmittance.

For the microparticles mentioned above, it is possible to use either one type of inorganic microparticles or plural types of inorganic microparticles in combination. By using plural types of microparticles each having a different characteristic, the required characteristics can further be improved efficiently.

The inorganic microparticles preferably has an average particle diameter being 1 nm or larger and being 30 nm or smaller and more preferably has an average particle diameter being 1 nm or more and being 10 nm or less. When the average particle diameter is less than 1 nm, dispersion of the inorganic microparticles is difficult, resulting in a fear that the required efficiency may not be obtained, therefore, it is preferable that the average particle diameter is 1 nm or more. When the average particle diameter exceeds 30 nm, thermoplastic material composition obtained becomes muddy and transparency is lowered, resulting in a fear that the light transmittance may become less than 70%, therefore, it is preferable that the average particle diameter is 30 nm or less. The average particle size mentioned here means volume average value of a diameter (particle diameter in conversion to sphere) in conversion from each particle into a sphere having the same volume as that of the particle.

Further, a form of an inorganic microparticle is not limited in particular, but a spherical microparticle is used preferably. To be concrete, a range of 0.5 to 1.0 for the ratio of the minimum size of the particle (minimum value of the distance between opposing two tangents each touching the outer circumference of the microparticle)/the maximum size (maximum value of the distance between opposing two tangents each touching the outer circumference of the microparticle) is preferable, and a range of 0.7 to 1.0 is more preferable.

A distribution of particle sizes is not limited in particular, but a relatively narrow distribution is used suitably, rather than a broad distribution, for making the invention to exhibit its effect efficiently.

Further, in the above embodiment preferably satisfies the following expression.

$$2.0 \leq \phi \leq 2.8 \tag{9}$$

The objective lens satisfying the conditional expression (9) prevents a working distance from being excessively short with enabling miniaturization of the optical pickup apparatus.

Further, in the above embodiment preferably satisfies the following expression.

$$0.7 < d/f < 1.1 \tag{10}$$

The objective lens satisfying the conditional expression (10) provides further contribution about down-sizing of the optical pickup apparatus with securing a suitable working distance for actual use.

In the above embodiment, it is preferable that the optical information recording medium includes a plurality of information recording surfaces. By providing plural layers of information recording surfaces, the optical pickup apparatus can record and reproduce information whose amount is a plurality of times of an amount of information to be recorded and reproduced on a single information recording surfaces.

Another preferred embodiment according to the present invention is an objective lens unit for an optical pickup apparatus including: an aberration correcting element comprising a resin; and the objective lens described in the above preferred embodiment. In this embodiment, the objective lens unit includes a resin aberration correcting element additionally to the objective lens. Therefore, it enables to provide a simplified objective lens by providing a variety of structure such as a diffractive structure to the aberration correcting element without adding any complicated structure such as a diffractive structure to the objective lens. Therefore, it provides high performance to the objective lens by forming the objective lens as a glass lens. Further, even if the embodiment is utilized for a compatible objective lens commonly used for recording or reproducing information for a plurality of types of optical discs whose formats are different each other, it provides advantages that the objective lens unit is produced relatively easily and that the cost of the objective lens unit is reduced.

Another proffered embodiment according to the present invention is an optical pickup apparatus including: a first light source for emitting a light flux with a wavelength $\lambda 1$ (380 nm<$\lambda 1$<420 nm); an objective lens in the above embodiments; and a photodetector. The optical pickup apparatus records or reproduces information by conversing the light flux with the wavelength $\lambda 1$ emitted from the first light source onto an information recording surface of a first optical information recording medium having a protective layer with a thickness t1 through the objective lens. Here, a meaning of "recording or reproducing information" is explained using examples about a product specification of an optical pickup apparatus. It may represent a product which only records information on an information recording surface of an optical information recording medium, and also may represent a product which only represents information recorded on an information recording surface of an optical information recording medium. Further, it naturally also may represent a product which records information on an information recording surface of an optical information recording medium and also reproduces information recorded on an information recording surface of an optical information recording medium. Accordingly, an objective lens or an objective lens unit according to the present invention similarly may be used for information recording or reproducing and also may be used for both of information recording and reproducing. Here, "reproducing information" includes a meaning of "reading information" simply.

It is preferable that an optical pickup apparatus in the above embodiments further includes a second light source for emitting a light flux with a wavelength $\lambda 2$ ($\lambda 1 < \lambda 2$), and the optical pickup apparatus records or reproduces information by conversing the light flux with the wavelength $\lambda 2$ onto an information recording surface of a second optical information recording medium having a protective layer with a thickness t2 (t2>t1) through the objective lens. It enables the optical pickup apparatus to record or reproduce information compatibly for two different types of optical discs including BD, DVD, and CD. Since the embodiment provides enough working distance by satisfying the conditional expression (1) to (5), it can record or reproduce information compatibly for two different types of optical discs. Further, the embodiment may record information for an optical information recording medium and may reproduce information for the other optical information recording medium, alternatively, it may record and reproduce information for the other optical information recording medium.

It is preferable that the above embodiment further includes a third light source for emitting a light flux with a wavelength $\lambda 3$ ($\lambda 2 < \lambda 3$) and the optical pickup apparatus records or reproduces information by conversing the light flux with the wavelength $\lambda 3$ onto an information recording surface of a third optical information recording medium having a protective layer with a thickness t3 (t3>t2) through the objective lens. It enables the optical pickup apparatus to record or reproduce information compatibly for three different types of optical discs including BD, DVD, and CD. Since the embodiment provides enough working distance by satisfying the conditional expression (1) to (5), it can record or reproduce information compatibly for the three different types of optical discs. Further, the embodiment may records information for an optical information recording medium and may reproduce information for another optical information recording medium (media), and also may record and reproduce information for an optical information recording medium.

In this specification, an objective lens is defined as a lens having a light converging action placed at the most nearest position to an optical information medium and facing the optical information medium in a condition that the optical information medium is mounted in an optical pickup apparatus.

According to the present invention, an objective lens and an objective lens unit having a longer working distance compared to a focal length, which are used for an optical pickup apparatus and an optical pickup apparatus using the objective lens, can be provided.

Figure 2:
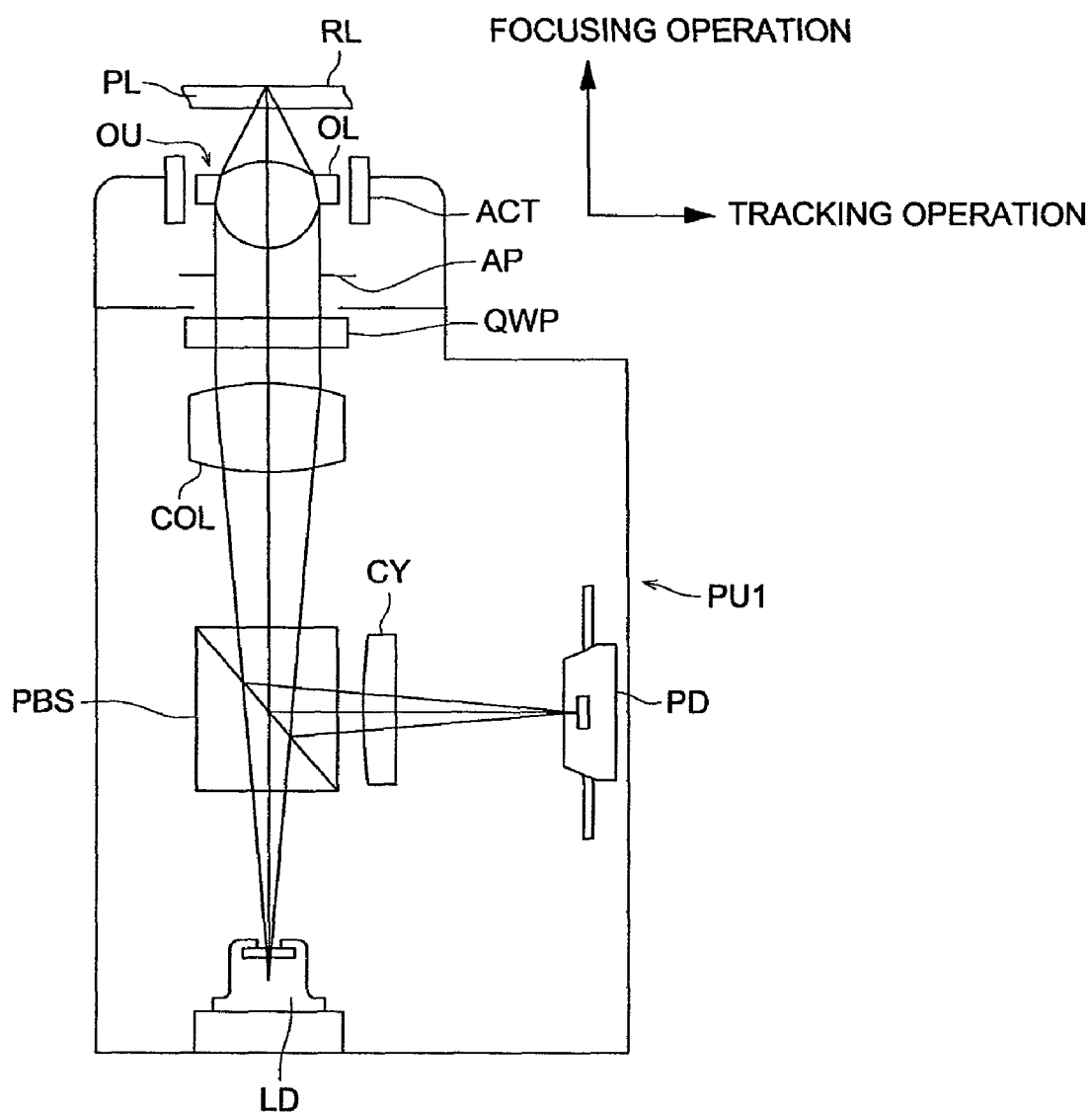
FIG. 2 illustrates a schematic cross sectional view of an optical pickup apparatus in an embodiment according to the present invention.

Preferable embodiments according to the present invention will be described by using drawings below. FIG. 2 illustrates a schematic cross sectional view of an optical pickup apparatus PU1 according to the first embodiment, which is capable of recording and reproducing information for a high density optical disc.

Firstly, a blue violet semiconductor laser diode LD is turned on so that the light path drawn in a solid line as illustrated in FIG. 2 can be formed. A divergent light flux emitted from the blue violet laser diode LD passes through a polarized beam splitter PBS. The divergent light flux is converted into a parallel light flux by a collimator lens COL and pass through a $\lambda/4$ wavelength plate QWP. A diaphragm AP regulates the parallel light flux. The parallel light flux is formed into a light spot by the objective lens OL of the objective lens unit OU on the information recording surface via a protective layer PL of BD. The objective lens unit OU, which is supported by two-axis actuator ACT disposed around the objective lens unit OU conducts focusing and tracking operations.

The light flux modulated and reflected by information pits on the information recording surface RL passes through the objective lens OL, the diaphragm AP, $\lambda/4$ plate QWP, the collimator lens COL again. Then the light flux is reflected by the polarized beam splitter PBS and converged onto a receiving surface of a photo-detector PD after passing through the cylindrical lens CY. The information recorded on the BD is read out by using the output signals of the photo-detector PD.

Focus detection and tracking detection are conducted by detecting the spot shape change on the photo-detector PD and the change of amount of light by the position change. A focusing actuator and a tracking actuator ACT are provided to move the objective lens so that the light flux from the semiconductor laser diode is formed into an optical image on the information recording surface RL of the BD based on this detection.

Figure 3:
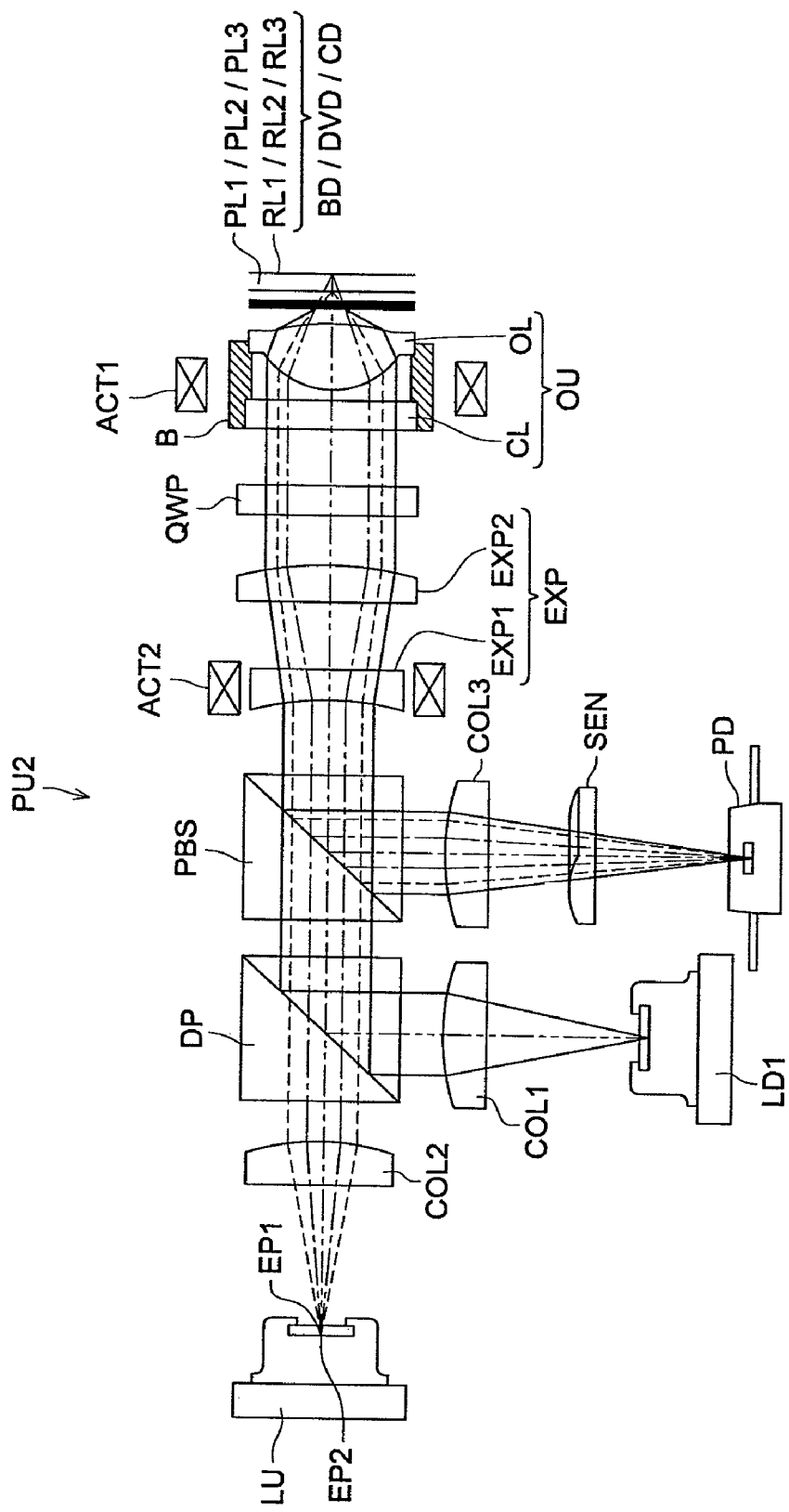
FIG. 3 illustrates a schematic sectional view of a compatible optical pickup apparatus in an embodiment according to the present invention.

FIG. 3 illustrates a schematic cross sectional view of an optical pickup apparatus PU2 according to a second embodiment of the present invention, which is capable of recording or reproducing information for the whole of a high density optical disc BD (the first optical disc OD1), a DVD (the second optical disc OD2) and a CD (the third optical disc OD3). In this embodiment, the second semiconductor laser LD2 and the third semiconductor laser LD3 are disposed side by side on the same printed circuit board. The second semiconductor laser LD 2 and the third semiconductor laser LD3 are structured into a light source unit LU in which two lasers with different wavelength is integrated in one light source unit.

In the optical pickup apparatus PU2, when recording or reproducing information for BD, the blue violet semiconductor laser diode LD1 is turn on so as to form the light path drawn in a solid line as illustrated in FIG. 3. A divergent light flux emitted from the blue violet semiconductor laser diode LD1 is converted into a parallel light flux by a first collimator lens COL1. The parallel light flux is reflected by dichroic prism DP and passes through the polarized beam splitter PBS and is shaped into a light flux having a wider diameter while the light flux passes through a first lens EXP1 and a second lens EXP2 which form expander lens EXP. Then light flux passes through the λ/4 plate QWP and the diameter of the light flux is regulated by a diaphragm (not shown). Then the objective lens unit OU structured by a resin aberration correcting element CL and the objective lens OL fixed in the optical axis direction by a lens frame B shapes the light flux into a light spot onto the information recoding surface RL1 through the protective layer PL1 of the BD. The objective lens unit OU, which is supported by two-axis actuator ACT1 disposed around the objective lens unit OU conducts focusing and tracking operations.

A reflected light flux modulated by information pits on the information recording surface RL1 passes through the objective lens OL, the λ/4 plate QWP, the second lens EXP2, the first lens EXP1 again. Further the light flux is reflected by the polarized beam splitter PBS and shaped into a convergent light flux while passing through the collimator lens COL3. Then astigmatism is added to the light flux by a sensor lens SEN. Then the light flux is converged onto a receiving surface of a photo-detector PD. The information recorded on the BD is read out by using the output signals of the photo-detector PD.

In the optical pickup apparatus PU2, when recording or reproducing information onto or from DVD, the emitting point EP1 of the unit light source LU is turn on so as to form the light path drawn in a broken line as illustrated in FIG. 3. A divergent light flux emitted from the emitting point EP1 is converted into a parallel light flux a second collimator lens COL2 as illustrated by the broken line in FIG. 3. The parallel light flux passes through a dichroic prism DP and the polarized beam splitter PBS, and the parallel light flux is shaped into a light flux having a wider diameter while the light flux passes through a first lens EXP1 and a second lens EXP2. Then light flux passes through the λ/4 plate QWP. Then the objective lens unit OU shapes the light flux into a light spot onto the information recoding surface RL2 through the protective layer PL2 of the DVD. The objective lens unit OU, which is supported by two-axis actuator ACT1 disposed around the objective lens unit OU conducts focusing and tracking operations.

A reflected light flux modulated by information pits on the information recording surface RL2 passes through the objective lens unit OU, the λ/4 plate QWP, the second lens EXP2, the first lens EXP1 again. Further the light flux is reflected by the polarized beam splitter PBS and shaped into a convergent light flux while passing through the collimator lens COL3. Then astigmatism is added to the light flux by a sensor lens SEN. Then the light flux is converged onto a receiving surface of a photo-detector PD. The information recorded on the DVD is read out by using the output signals of the photo-detector PD.

In the optical pickup apparatus PU2, when recording or reproducing information for CD, the emitting point EP2 of the unit light source LU is turn on after driving the first lens EXP1 in the optical axis direction by a one axis actuator ACT2 so that the space between the first lens EXP1 and the second lens EXP 2 becomes narrower than that when recording and reproducing the information for BD. A divergent light flux emitted from the emitting point EP2 is converted into a parallel light flux by a second collimator lens COL 2 as illustrated by the broken line in FIG. 3. The parallel light flux passes through a dichroic prism DP and the polarized beam splitter PBS, and the parallel light flux is shaped into a light flux having a wider diameter while the light flux passes through a first lens EXP1 and a second lens EXP2. Then light flux passes through the λ/4 plate QWP. Then the objective lens unit OU shapes the light flux into a light spot onto the information recoding surface RL3 through the protective layer PL3 of the CD. The objective lens unit OU, which is supported by two-axis actuator ACT1 disposed around the objective lens unit OU conducts focusing and tracking operations.

A reflected light flux modulated by information pits on the information recording surface RL2 passes through the objective lens OL, the λ/4 plate QWP, the second lens EXP2, the first lens EXP1 again. Further the light flux is reflected by the polarized beam splitter PBS and is shaped into a convergent light flux while passing through the collimator lens COL3. Then astigmatism is added to the light flux by a sensor lens SEN. Then the light flux is converged onto a receiving surface of a photo-detector PD. The information recorded on the CD is read out by using the output signals of the photo-detector PD.

EXAMPLES

Examples of the preferable embodiments according to the present invention will be described below. The examples 1-6, and 9 of the objective lenses are preferable examples of the first embodiment of the optical pickup apparatus and examples 7, 8, and 10 are the preferable examples of the second embodiment of optical pickup apparatus. Hereinafter, (including lens data in tables), a power of 10 (for example $2.5 \times 10^{-3}$) will be expressed 2.5E-3 by using E.

Optical surfaces of an aberration correcting element of an objective lens unit and objective lens are respectively formed by aspherical surfaces, which are axis symmetry and defined by an expression with the coefficients shown in the Tables respectively substituted.

$$Z=(y^2/r)/[1+\sqrt{1-(K+1)(y/r)^2}]+A_0+A_4y^4+A_6y^6+A_8y^8+A_{10}y^{10}+A_{12}y^{12}+A_{14}y^{14}+A_{16}y^{16}+A_{18}y^{18}+A_{20}y^{20}$$

Where, Z denotes an aspherical shape (the distance from the flat surface contacting the surface vertex of the aspherical surface along the optical axis), y denotes the distance from the optical axis, r denotes radius of curvature, K denotes a conic coefficient, $A_0$ denotes an amount of offset of the aspherical surface and $A_4$, $A_6$, $A_8$, $A_{12}$, $A_{14}$, $A_{16}$, $A_{18}$ and $A_{20}$ denote aspherical surface coefficients.

Particularly, the optical path difference given to the light fluxes having respective wavelengths by the diffractive structure (a phase structure) in the second embodiment are defined by the expression with the coefficients shown in the Tables substituted respectively.

$$\Phi = m \times \lambda/\lambda_B \times (C_1y^2+C_2y^4+C_3y^6+C_4y^8+C_5y^{10})$$

Where, $\Phi$ denotes an optical path difference function, $\lambda$ denotes the wavelength of an incident light flux into the diffractive structure, $\lambda_B$ denotes the manufactured wavelength, m denotes the diffraction order of the diffracted light flux used for recording or reproducing of the optical disc, y denotes the distance from the optical axis and $C_1$, $C_2$, $C_3$, $C_4$ and $C_5$ denote the coefficients of the optical path difference function.

Example 1

The lens data of the EXAMPLE 1 (including the focal length of the resin objective lens, an image side numerical aperture and the magnification) will be shown Table 1.

TABLE 1

| EXAMPLE 1 lens data | | | | |
|---|---|---|---|---|
| Focal length of the objective lens: f = 1.647 mm | | | | |
| Image side numerical aperture: NA: 0.85 | | | | |
| Magnification: m: 0 | | | | |
| The i-th surface | ri | di (408 nm) | ni (408 nm) | νd |
| 0 | ∞ | | | |
| 1 (diaphragm diameter) | | 0.0 (φ2.8 mm) | | |
| 2 | 1.0290 | 1.798 | 1.5136 | 60.0 |
| 3 | −1.9340 | 0.616 | | |
| 4 | ∞ | 0.0875 | 1.6183 | 31.3 |
| 5 | ∞ | | | |

| The second surface Aspherical surface coefficient | |
|---|---|
| κ | −6.44186E−01 |
| A4 | 1.68005E−02 |
| A6 | 3.39496E−03 |
| A8 | 1.11932E−02 |
| A10 | −1.61029E−02 |
| A12 | 1.10889E−02 |
| A14 | 5.93834E−03 |
| A16 | −1.35634E−02 |
| A18 | 7.71739E−03 |
| A20 | −1.48330E−03 |

| The third surface Aspherical surface coefficient | |
|---|---|
| κ | −2.54905E+01 |
| A4 | 1.93518E−01 |
| A6 | −3.73436E−01 |
| A8 | 5.35728E−01 |
| A10 | −4.96321E−01 |
| A12 | 2.73295E−01 |

TABLE 1-continued

| EXAMPLE 1 lens data | |
|---|---|
| A14 | −8.17010E−02 |
| A16 | 1.02263E−02 |

Example 2

The lens data of the EXAMPLE 2 (including the focal length of the resin objective lens, an image side numerical aperture and the magnification) will be shown in Table 2.

TABLE 2

| EXAMPLE 2 lens data | | | | |
|---|---|---|---|---|
| Focal length of the objective lens: f = 1.647 mm | | | | |
| Image side numerical aperture: NA: 0.85 | | | | |
| Magnification: m: 0 | | | | |
| The i-th surface | ri | di (408 nm) | ni (408 nm) | νd |
| 0 | ∞ | | | |
| 1 (diaphragm diameter) | | 0.0 (φ2.8 mm) | | |
| 2 | 1.0211 | 1.710 | 1.5136 | 60.0 |
| 3 | −2.1289 | 0.658 | | |
| 4 | ∞ | 0.0875 | 1.6183 | 31.3 |
| 5 | ∞ | | | |

| The second surface Aspherical surface coefficient | |
|---|---|
| κ | −6.42259E−01 |
| A4 | 1.47042E−02 |
| A6 | 5.01918E−03 |
| A8 | 1.10433E−02 |
| A10 | −1.69144E−02 |
| A12 | 1.09726E−02 |
| A14 | 6.21470E−03 |
| A16 | −1.33447E−02 |
| A18 | 7.69311E−03 |
| A20 | −1.53758E−03 |

| The third surface Aspherical surface coefficient | |
|---|---|
| κ | −2.25319E+01 |
| A4 | 1.95744E−01 |
| A6 | −3.71552E−01 |
| A8 | 5.34088E−01 |
| A10 | −4.96521E−01 |
| A12 | 2.72857E−01 |
| A14 | −8.08411E−02 |
| A16 | 9.95302E−03 |

Example 3

The lens data of the EXAMPLE 3 (including the focal length of the glass objective lens, an image side numerical aperture and the magnification) will be shown in Table 3.

TABLE 3

| EXAMPLE 3 lens data | | | | |
|---|---|---|---|---|
| Focal length of the objective lens: f = 1.647 mm | | | | |
| Image side numerical aperture: NA: 0.85 | | | | |
| Magnification: m: 0 | | | | |
| The i-th surface | ri | di (408 nm) | ni (408 nm) | νd |
| 0 | ∞ | | | |
| 1 (diaphragm diameter) | | 0.0 (φ2.8 mm) | | |

TABLE 3-continued

EXAMPLE 3 lens data

| | | | | |
|---|---|---|---|---|
| 2 | 1.2117 | 1.572 | 1.7499 | 60.0 |
| 3 | 27.8825 | 0.678 | | |
| 4 | ∞ | 0.0875 | 1.6183 | 31.3 |
| 5 | ∞ | | | |

The second surface
Aspherical surface coefficient

| | |
|---|---|
| κ | −6.41291E−01 |
| A4 | 1.27008E−02 |
| A6 | 1.37186E−02 |
| A8 | 6.03088E−04 |
| A10 | −1.45275E−02 |
| A12 | 1.28733E−02 |
| A14 | 5.91916E−03 |
| A16 | −1.40554E−02 |
| A18 | 7.52590E−03 |
| A20 | −1.38489E−03 |

The third surface
Aspherical surface coefficient

| | |
|---|---|
| κ | −3.55468E+04 |
| A4 | 1.86770E−01 |
| A6 | −3.67212E−01 |
| A8 | 5.29197E−01 |
| A10 | −5.02276E−01 |
| A12 | 2.73081E−01 |
| A14 | −7.85187E−02 |
| A16 | 9.22811E−03 |

Example 4

The lens data of the EXAMPLE 4 (including the focal length of the glass objective lens, an image side numerical aperture and the magnification) will be shown in Table 4.

TABLE 4

EXAMPLE 4 lens data

Focal length of the objective lens: f = 1.647 mm
Image side numerical aperture: NA: 0.85
Magnification: m: 0

| The i-th surface | ri | di (408 nm) | ni (408 nm) | νd |
|---|---|---|---|---|
| 0 | ∞ | | | |
| 1 (diaphragm diameter) | | 0.0 (φ2.8 mm) | | |
| 2 | 1.1865 | 1.257 | 1.7499 | 60.0 |
| 3 | 16.6587 | 0.843 | | |
| 4 | ∞ | 0.0875 | 1.6183 | 31.3 |
| 5 | ∞ | | | |

The second surface
Aspherical surface coefficient

| | |
|---|---|
| κ | −6.43114E−01 |
| A4 | 2.41795E−02 |
| A6 | −1.94600E−03 |
| A8 | 1.29946E−02 |
| A10 | −1.70094E−02 |
| A12 | 1.09625E−02 |
| A14 | 6.33792E−03 |
| A16 | −1.33581E−02 |
| A18 | 7.71319E−03 |
| A20 | −1.60553E−03 |

The third surface
Aspherical surface coefficient

| | |
|---|---|
| κ | −1.49489E+03 |
| A4 | 1.45330E−01 |
| A6 | −3.21817E−01 |

TABLE 4-continued

EXAMPLE 4 lens data

| | |
|---|---|
| A8 | 5.27171E−01 |
| A10 | −5.07919E−01 |
| A12 | 2.73624E−01 |
| A14 | −7.79441E−02 |
| A16 | 9.08508E−03 |

Example 5

The lens data of the EXAMPLE 5 (including the focal length of the glass objective lens, an image side numerical aperture and the magnification) will be shown in Table 5.

TABLE 5

EXAMPLE 5 lens data

Focal length of the objective lens: f = 1.647 mm
Image side numerical aperture: NA: 0.85
Magnification: m: 0

| The i-st surface | ri | di (408 nm) | ni (408 nm) | νd |
|---|---|---|---|---|
| 0 | ∞ | | | |
| 1 (diaphragm diameter) | | 0.0 (φ2.8 mm) | | |
| 2 | 1.1040 | 1.680 | 1.6048 | 61.3 |
| 3 | −4.3512 | 0.650 | | |
| 4 | ∞ | 0.0875 | 1.6183 | 31.3 |
| 5 | ∞ | | | |

The second surface
Aspherical surface coefficient

| | |
|---|---|
| κ | −6.86275E−01 |
| A4 | 1.58628E−02 |
| A6 | 2.15298E−02 |
| A8 | −1.60452E−02 |
| A10 | 3.95696E−03 |
| A12 | 8.37083E−03 |
| A14 | 2.33859E−03 |
| A16 | −1.29829E−02 |
| A18 | 8.59013E−03 |
| A20 | −1.79269E−03 |

The third surface
Aspherical surface coefficient

| | |
|---|---|
| κ | 2.97361E+00 |
| A4 | 2.84978E−01 |
| A6 | −4.39612E−01 |
| A8 | 5.55607E−01 |
| A10 | −4.84711E−01 |
| A12 | 2.54382E−01 |
| A14 | −7.23929E−02 |
| A16 | 8.49351E−03 |

Example 6

The lens data of the EXAMPLE 6 (including the focal length of the glass objective lens, an image side numerical aperture and the magnification) will be shown in Table 6.

TABLE 6

EXAMPLE 6 lens data

Focal length of the objective lens: f = 1.177 mm
Image side numerical aperture: NA: 0.85
Magnification: m: 0

| The i-st surface | ri | di (408 nm) | ni (408 nm) | νd |
|---|---|---|---|---|
| 0 | ∞ | | | |
| 1 (diaphragm diameter) | | 0.0 (φ2.0 mm) | | |
| 2 | 0.8224 | 1.059 | 1.6694 | 55.7 |
| 3 | −8.9353 | 0.515 | | |
| 4 | ∞ | 0.0875 | 1.6183 | 31.3 |
| 5 | ∞ | | | |

The second surface
Aspherical surface coefficient

| κ | −6.38559E−01 |
|---|---|
| A4 | 5.01023E−02 |
| A6 | 4.97456E−02 |
| A8 | 2.84314E−02 |
| A10 | −2.56877E−01 |
| A12 | 4.47964E−01 |
| A14 | 4.34427E−01 |
| A16 | −2.10817E+00 |
| A18 | 2.40380E+00 |
| A20 | −9.34614E−01 |

TABLE 6-continued

EXAMPLE 6 lens data

The third surface
Aspherical surface coefficient

| κ | 5.84291E+01 |
|---|---|
| A4 | 5.53248E−01 |
| A6 | −2.08153E+00 |
| A8 | 5.99738E+00 |
| A10 | −1.05168E+01 |
| A12 | 1.04354E+01 |
| A14 | −5.43120E+00 |
| A16 | 1.13901E+00 |

Example 7

The lens data of the EXAMPLE 7 (including the focal length of the glass objective lens, an image side numerical aperture and the magnification) will be shown in Table 7. In the EXAMPLE 7, the aberration correcting element (CL in FIG. 3) made of resin arranged close to the light source side includes the second surface and the third surface and the diffractive structure providing an optical path difference represented by the optical path difference function described above is given to the both flat surfaces of the aberration correcting element. However on the second and the third surfaces, the diffractive structure is not given to the area located at a distance y from the optical axis, which is larger than the upper limit of the defined area. This diffractive structure is provided to correct spherical aberration caused by the differences of the thickness of protective layers of different recording media when trying to keep the compatibility of the different information recoding media.

TABLE 7

EXAMPLE 7

Lens data

| Focal length of the objective lens | $f_1$ = 1.65 mm, | $f_2$ = 1.70 mm, | $f_3$ = 1.94 mm |
|---|---|---|---|
| Image side numerical aperture | NA1: 0.85 | NA2: 0.60 | NA3: 0.45 |
| Magnification | m1: 0 | m2: 0 | m3: 0 |

| The i-th surface | ri | di (408 nm) | ni (408 nm) | di (658 nm) | ni (658 nm) | di (785 nm) | ni (785 nm) | νd |
|---|---|---|---|---|---|---|---|---|
| 0 | ∞ | | | ∞ | | ∞ | | |
| 1 (diaphragm diameter) | | 0.0 (φ2.8 mm) | | 0.0 (φ2.02 mm) | | 0.0 (φ1.67 mm) | | |
| 2 | ∞ | 0.500 | 1.5559 | 0.500 | 1.5370 | 0.500 | 1.5334 | 56.0 |
| 3 | ∞ | 0.100 | | 0.100 | | 0.100 | | |
| 4 | 1.1040 | 1.680 | 1.6048 | 1.680 | 1.5861 | 1.680 | 1.5824 | 60.0 |
| 5 | −4.3512 | 0.650 | | 0.367 | | 0.277 | | |
| 6 | ∞ | 0.0875 | 1.6148 | 0.6 | 1.5773 | 1.2 | 1.5709 | 31.3 |
| 7 | ∞ | | | | | | | |

The second surface (0 mm ≦ y ≦ 1.010 mm)
Optical path difference function
(BD: 0-th order, DVD: 1-st order, CD: 0-th order and the manufactured wavelength: 658 nm)

| C1 | 6.40910E−04 |
|---|---|
| C2 | ±4.00110E−03 |
| C3 | 1.16300E−03 |
| C4 | −2.54476E−03 |
| C5 | 8.66208E−04 |

The third surface (0 mm ≦ y ≦ 0.835 mm)
Optical path difference function
(BD: 0-th order, DVD: 0-th order, CD: 1-st order and the manufactured wavelength: 785 nm)

| C1 | 4.38653E−02 |
|---|---|
| C2 | −3.72650E−03 |

TABLE 7-continued

EXAMPLE 7

| | |
|---|---|
| C3 | 1.03744E−02 |
| C4 | −1.18762E−02 |
| C5 | 5.70899E−03 |

The fourth surface
Aspherical surface coefficient

| | |
|---|---|
| κ | −6.86275E−01 |
| A4 | 1.58628E−02 |
| A6 | 2.15298E−02 |
| A8 | −1.60452E−02 |
| A10 | 3.95696E−03 |
| A12 | 8.37083E−03 |
| A14 | 2.33859E−03 |
| A16 | −1.29829E−02 |
| A18 | 8.59013E−03 |
| A20 | −1.79269E−03 |

The fifth surface
Aspherical surface coefficient

| | |
|---|---|
| κ | 2.97361E+00 |
| A4 | 2.84978E−01 |
| A6 | −4.39612E−01 |
| A8 | 5.55607E−01 |
| A10 | −4.84711E−01 |
| A12 | 2.54382E−01 |
| A14 | −7.23929E−02 |
| A16 | 8.49351E−03 |

Example 8

The lens data of the EXAMPLE 8 (including the focal length of the glass objective lens, an image side numerical aperture and the magnification) will be shown in Table 8. In the EXAMPLE 8, the aberration correcting element (CL in FIG. 3) made of resin arranged close to the light source side includes the second surface and the third surface and the diffractive structure providing an optical path difference represented by the optical path difference function described above is given to the both flat surfaces of the aberration correcting element. However on the second and the third surfaces, the diffractive structure is not given to the area located at a distance y from the optical axis, which is larger than the upper limit of the defined area. This diffractive structure is provided to correct spherical aberration caused by the differences of the thickness of protective layers of different recording media when trying to keep the compatibility of the different information recoding media.

TABLE 8

EXAMPLE 8

Lens data

| Focal length of the objective lens | $f_1$ = 1.18 mm, | $f_2$ = 1.27 mm, | $f_3$ = 1.50 mm |
|---|---|---|---|
| Image side numerical aperture | NA1: 0.85 | NA2: 0.60 | NA3: 0.45 |
| Magnification | m1: 0 | m2: 0 | m3: 0 |

| The i-th surface | ri | di (408 nm) | ni (408 nm) | di (658 nm) | ni (658 nm) | di (785 nm) | ni (785 nm) |
|---|---|---|---|---|---|---|---|
| 0 | ∞ | | | | | | |
| 1 (diaphragm diameter) | | 0.0 (φ2.00 mm) | | 0.0 (φ1.45 mm) | | 0.0 (φ1.23 mm) | |
| 2 | ∞ | 0.500 | 1.5559 | 0.500 | 1.5370 | 0.500 | 1.5334 |
| 3 | ∞ | 0.100 | | 0.100 | | 0.100 | |
| 4 | 0.7877 | 1.118 | 1.6048 | 1.118 | 1.5861 | 1.118 | 1.5824 |
| 5 | −3.4239 | 0.494 | | 0.311 | | 0.170 | |
| 6 | ∞ | 0.0875 | 1.6184 | 0.6 | 1.5773 | 1.2 | 1.5709 |
| 7 | ∞ | | | | | | |

The second surface (0 mm ≦ y ≦ 0.725 mm)
Optical path difference function
(BD: 0-th order, DVD: 1-st order, CD; 0-th order and the manufactured wavelength: 658 nm)

| | |
|---|---|
| C1 | 3.66160E−02 |
| C2 | −3.25510E−03 |
| C3 | −3.34888E−03 |
| C4 | 1.16352E−02 |
| C5 | −1.88930E−02 |

TABLE 8-continued

EXAMPLE 8

The third surface (0 mm ≦ y ≦ 0.615 mm)
Optical path difference function
(BD: 0-th order, DVD: 0-th order, CD; 1-st order and the
manufactured wavelength: 785 nm)

| | |
|---|---|
| C1 | 9.61472E−02 |
| C2 | −1.03464E−02 |
| C3 | 1.04707E−01 |
| C4 | −1.93540E−01 |
| C5 | 2.42723E−01 |

The fourth surface
Aspherical surface coefficient

| | |
|---|---|
| κ | −6.84702E−01 |
| A4 | 5.08565E−02 |
| A6 | 1.09410E−01 |
| A8 | −1.66037E−01 |
| A10 | 8.27804E−02 |
| A12 | 3.40634E−01 |
| A14 | 1.83456E−01 |
| A16 | −2.02036E+00 |
| A18 | 2.61960E+00 |
| A20 | −1.05658E+00 |

The fifth surface
Aspherical surface coefficient

| | |
|---|---|
| κ | 5.02886E+00 |
| A4 | 7.10269E−01 |
| A6 | −2.25904E+00 |
| A8 | 5.89571E+00 |
| A10 | −1.00580E+01 |
| A12 | 1.02702E+01 |
| A14 | −5.75193E+00 |
| A16 | 1.35971E+00 |

Example 9

The lens data of the EXAMPLE 9 (including the focal length of the glass objective lens, an image side numerical aperture and the magnification) will be shown in Table 9.

TABLE 9

EXAMPLE 9 lens data

Focal length of the objective lens: f = 2.25 mm
Image side numerical aperture: NA: 0.85
Magnification: m: 0

| The i-th surface | ri | di (408 nm) | ni (408 nm) | νd |
|---|---|---|---|---|
| 0 | ∞ | | | |
| 1 (diaphragm diameter) | | 0.0 (φ3.825 mm) | | |
| 2 | 1.6799 | 2.100 | 1.7807 | 60.0 |
| 3 | 17.0751 | | | |
| 4 | ∞ | 0.0875 | 1.6183 | 31.3 |
| 5 | ∞ | | | |

The second surface
Aspherical surface coefficient

| | |
|---|---|
| κ | −7.16928E−01 |
| A4 | 2.96471E−03 |
| A6 | 7.92861E−03 |
| A8 | −3.30212E−03 |
| A10 | 1.84193E−04 |
| A12 | 3.74609E−04 |
| A14 | 4.56503E−05 |
| A16 | −1.27182E−04 |
| A18 | 4.07508E−05 |
| A20 | −4.23296E−06 |

TABLE 9-continued

EXAMPLE 9 lens data

The third surface
Aspherical surface coefficient

| | |
|---|---|
| κ | −6.64087E+03 |
| A4 | 8.21466E−02 |
| A6 | −9.15005E−02 |
| A8 | 6.42638E−02 |
| A10 | −2.99087E−02 |
| A12 | 8.11598E−03 |
| A14 | −1.18210E−03 |
| A16 | 7.26725E−05 |
| A18 | 0.00000E+00 |
| A20 | 0.00000E+00 |

Example 10

The lens data of the EXAMPLE 10 (including the focal length of the glass objective lens, an image side numerical aperture and the magnification) will be shown in Table 10. In the EXAMPLE 10, the aberration correcting element (CL in FIG. 3) made of resin arranged close to the light source side includes the second surface and the third surface and the diffractive structure providing an optical path difference represented by the optical path difference function described above is given to the aspherical surface and the flat surface of the aberration correcting element. This diffractive structure is provided to correct spherical aberration caused by the differences of the thickness of protective layers of different recording media when trying to keep the compatibility of the different information recoding media.

TABLE 10

EXAMPLE 10

Lens data

| Focal length of the objective lens | $f_1$ = 2.25 mm, | $f_2$ = 2.34 mm, | $f_3$ = 2.39 mm |
|---|---|---|---|
| Image side numerical aperture | NA1: 0.85 | NA2: 0.60 | NA3: 0.45 |
| Magnification | m1: 0 | m2: 0 | m3: 0 |

| The i-th surface | ri | di (408 nm) | ni (408 nm) | di (658 nm) | ni (658 nm) | di (785 nm) | ni (785 nm) |
|---|---|---|---|---|---|---|---|
| 0 | ∞ | ∞ | | ∞ | | ∞ | |
| 1 (diaphragm diameter) | | 0.0 (φ3.825 mm) | | 0.0 (φ2.81 mm) | | 0.0 (φ2.15 mm) | |
| 2 | 60.6854 | 0.500 | 1.5596 | 0.500 | 1.5406 | 0.500 | 1.5372 |
| 3 | ∞ | 0.100 | | 0.100 | | 0.100 | |
| 4 | 1.6799 | 2.100 | 1.7807 | 2.100 | 1.7561 | 2.100 | 1.7512 |
| 5 | 17.0751 | 0.967 | | 0.711 | | 0.375 | |
| 6 | ∞ | 0.0875 | 1.6184 | 0.6 | 1.5773 | 1.2 | 1.5709 |
| 7 | ∞ | | | | | | |

The second surface
Aspherical surface coefficient

| κ | 2.81462E+02 |
|---|---|
| A4 | −3.65128E−03 |
| A6 | −2.31672E−04 |
| A8 | −2.73952E−05 |
| A10 | −6.86209E−06 |
| A12 | −1.07189E−05 |
| A14 | 1.22919E−06 |
| A16 | 0.00000E+00 |
| A18 | 0.00000E+00 |
| A20 | 0.00000E+00 |

Optical path difference function
(BD: 1-st order, DVD: 1-st order, CD; 1-st order
and the manufactured wavelength: 530 nm)

| C1 | 6.04584E−03 |
|---|---|
| C2 | −2.70257E−03 |
| C3 | −4.25256E−05 |
| C4 | −3.61269E−05 |
| C5 | −2.32590E−05 |

The third surface
Aspherical surface coefficient

| κ | 0.00000E+00 |
|---|---|
| A4 | 0.00000E+00 |
| A6 | 0.00000E+00 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

Optical path difference function
(BD: 0-th order, DVD: 1-st order, CD; 0-th order
and the manufactured wavelength: 658 nm)

| C1 | −1.58233E−03 |
|---|---|
| C2 | −4.39541E−04 |
| C3 | 1.01477E−03 |
| C4 | −5.93201E−04 |
| C5 | 1.20366E−04 |

The fourth surface
Aspherical surface coefficient

| κ | −7.16928E−01 |
|---|---|
| A4 | 2.96471E−03 |
| A6 | 7.92861E−03 |
| A8 | −3.30212E−03 |
| A10 | 1.84193E−04 |
| A12 | 3.74609E−04 |
| A14 | 4.56503E−05 |
| A16 | −1.27182E−04 |
| A18 | 4.07508E−05 |
| A20 | −4.23296E−06 |

TABLE 10-continued

EXAMPLE 10

The fifth surface
Aspherical surface coefficient

| | |
|---|---|
| κ | −6.64087E+03 |
| A4 | 8.21466E−02 |
| A6 | −9.15005E−02 |
| A8 | 6.42638E−02 |
| A10 | −2.99087E−02 |
| A12 | 8.11598E−03 |
| A14 | −1.18210E−03 |
| A16 | 7.26725E−05 |
| A18 | 0.00000E+00 |
| A20 | 0.00000E+00 |

The diffractive structure represented by the optical path difference function, which has been given to the second surface in the Examples 7 and 8, does not diffract the first light flux having wavelength of λ1 (in this embodiment λ1=408 nm) and the third light flux having wavelength of λ3 (in this embodiment λ3=785 nm) but diffracts the second light flux having wavelength of λ2 (in this embodiment λ2=685 nm). The diffractive structure is a structure including plural patterns arranged in the shapes of concentric ring-shaped zones and each of the patterns has a cross section including the optical axis in a stepped shape. The cross section in a stepped shape has a structure in which steps is shifted per every predefined number of the levels of the steps by a height of steps corresponding to the number of the levels. In this embodiment, the steps in the cross section are shifted per every 5 levels by a height of the 4 steps.

The height of each step difference Δ1 of the step structure is set so as to satisfy the following formula, $\Delta 1 = 2 \times \lambda 1/(n_1 - 1) = 1.468$ μm. Where $n_1$ is a refractive index of the aberration correcting element CL at the wavelength of λ1 (in this embodiment, λ1=408 nm).

Since the optical path difference L1 added to the first light flux by the step structure is 2×λ1, the first light flux passes through the step structure without receiving any action.

The optical path difference N1 added to the third light flux by step difference Δ1 is 0.997×λ3≈1×λ3 (in this embodiment, λ3=785 nm), the third light flux also passes through the step structure as they are without receiving any action from the step structure.

The optical path difference M1 added to the second light flux by the step difference Δ1 is 1.198×λ2≈1.20×λ2 (in this embodiment, λ2=658 nm) and the phase difference of the second light flux, which pass through the neighboring levels between the step difference Δ1 becomes 2π×0.20 (the phase difference, which is made by subtracting a numbers produced by 2 π×n, where n is an integer and 2 π optically denotes the same phase). Since the cross section of one pattern in the shape of concentric ring-shaped zone is divided into five steps (levels), and the phase difference of the second light flux in one pattern becomes 5×2 π×0.20=2 π, the first order diffraction light is generated.

As described above, the step structure corrects spherical aberration caused by the differences of protective layers of the protective layers of BD and DVD by selectively diffracting only the second light flux. Here, the diffraction efficiency of the 0-th order diffraction light flux (transmitted light flux) of the first light flux caused by the step structure is 100%, the diffraction efficiency of the first order diffraction light flux of the second light flux is 87.5%, and the diffraction efficiency of the 0-th order diffraction light flux (transmitted light flux) of the third light flux is 100%. High diffraction efficiencies are obtained for any light fluxes as described above.

The optical path difference function given to the third surface in the examples 7 and 8 does not diffract the first light flux and the second light flux but diffracts the third light flux. The optical path difference function has a structure (a binary structure) in which grooves having the same depth are deployed in a centric circle shape centering on the optical axis.

The height of each step difference Δ1 of the binary structure is set so as to satisfy the following formula, $\Delta 2 = 5 \times \lambda 1/(n_1 - 1) = 3.670$ μm. Where $n_1$ is a refractive index of the aberration correcting element CL at wavelength of λ1.

The optical path difference L2 added to the first light flux by step difference Δ2 is 5×λ1, the first light flux pass through the step structure as they are without receiving any action from the binary structure.

The optical path difference M2 added to the second light flux by step difference Δ2 is 2.994×λ2≈3×λ2, the second light flux passes through the step structure as they are without receiving any action from the binary structure.

The optical path difference N2 added to the third light flux by the step difference Δ2 is 2.493×λ3≈2.5×λ3 and the phase difference of the third light flux, which passes through the neighboring levels of the step difference Δ2 becomes 2π×0.5 (the phase difference, which is made by subtracting a numbers produced by 2 π×n, where n is an integer and 2π optically denotes the same phase). Since the phase difference of the third light flux in one binary structure becomes 2×2 π×0.5=2 π, the first order diffraction light is generated.

As described above, the binary structure corrects the spherical aberration caused by the difference of the protective layers of BD and CD by selectively diffracting only the third light flux.

Here, the diffraction efficiency of the 0-th order diffraction light flux (transmitted light flux) of the first light flux caused by the binary step structure is 100%, the diffraction efficiency of the 0-th order diffraction light flux (transmitted light flux) of the second light flux is 100%, and the diffraction efficiency of the first order diffraction light flux of the third light flux is 40.5%.

With regard to the respective examples, the values corresponding to the expressions (1)-(3) described above will be shown in Table 11.

TABLE 11

| | Examples | | | | |
|---|---|---|---|---|---|
| | 1 | 2 | 3 | 4 | 5 |
| Expression (1) φ(mm) | 2.8 | 2.8 | 2.8 | 2.8 | 2.8 |
| Expression (2) n at λ1 = 408 nm | 1.514 | 1.514 | 1.750 | 1.750 | 1.605 |
| Expression (3) d/f | 1.092 | 1.038 | 0.954 | 0.763 | 1.020 |

| | Examples | | | | |
|---|---|---|---|---|---|
| | 6 | 7 | 8 | 9 | 10 |
| Expression (1) φ(mm) | 2.0 | 2.8 | 2.0 | 3.8 | 3.8 |
| Expression (2) n at λ1 = 408 nm | 1.669 | 1.605 | 1.582 | 1.780 | 1.780 |
| Expression (3) d/f | 0.900 | 1.020 | 0.947 | 0.933 | 0.933 |

While the preferred embodiments of the present invention have been described using specific terms, such description is for illustrative purposes only, and it is to be understood that changes and variations may be made without departing from the sprit or scope of the appended claims.

What is claimed is:

1. An objective lens for an optical pickup apparatus recording or reproducing information by converging a light flux with a wavelength λ1 (380 nm<λ1<420 nm) emitted from a light source onto an information recording surface of an optical information recording medium, the objective lens consisting of:
a single lens including at least one aspheric surface,
wherein the objective lens satisfies following expressions:

$2.0 \leq \Phi \leq 4.0$, $1.5 < n < 1.75$, $0.7 < d/f < 1.2$, $0.8 < NA < 0.9$, and $-1.17n + 2.8 < d/f < -0.59n + 2.0$, where Φ (mm) is an effective aperture at a light source side of the objective lens,
d (mm) is a thickness on an optical axis of the objective lens,
f (mm) is a focal length of the objective lens,
NA is a numerical aperture at an image side of the objective lens, and
n is a refractive index of the objective lens for the wavelength λ1.

2. The objective lens of claim 1, wherein the objective lens comprises a glass.

3. The objective lens of claim 1, wherein the objective lens comprises a resin.

4. The objective lens of claim 1, wherein the optical information recording medium comprises a plurality of information recording surfaces.

5. An optical pickup apparatus comprising:
a first light source for emitting a light flux with a wavelength λ1 (380 nm<λ1<420 nm); and
an objective lens of claim 1,
wherein the optical pickup apparatus records or reproduces information by converging the light flux with the wavelength λ1 onto an information recording surface of a first optical information recording medium having a protective layer with a thickness t1 through the objective lens.

* * * * *